Oct. 11, 1960 E. F. BADGER 2,955,700
CONVEYOR CHAIN
Filed March 21, 1957

INVENTOR.
EUGENE F. BADGER,
BY
ATTORNEYS.

United States Patent Office 2,955,700
Patented Oct. 11, 1960

2,955,700

CONVEYOR CHAIN

Eugene F. Badger, Indianapolis, Ind., assignor to Diamond Chain Company, Inc., Indianapolis, Ind., a corporation of Indiana Filed Mar. 21, 1957, Ser. No. 647,706

4 Claims. (Cl. 198—189)

My invention relates to conveyor chains of the type in which a series of plates called top plates are secured to the chain links for supporting and carrying the articles to be moved by the chain. In such chains it has been found that the top plates are difficult and expensive to secure in a fixed operative position on the chain.

It is the object of my invention to increase the ease with which a top plate can be secured to the conveyor chain of the type described above. More specifically, it is my object to provide an inexpensive top plate type conveyor chain which can be readily assembled; which will have said top plates rigidly secured thereon; and which will provide a large article-supporting surface.

In carrying out my invention, I conveniently employ a chain of a generally conventional type embodying alternately inner links and pin links, the inner links having transverse holes which rotatably receive pins extending through the link plates of the pin links. My chain differs from conventional power transmitting chains, however, in that each of said links is provided with grooves cut in its top edge.

Associated with each of said links is a top plate having an article-supporting platform and a pair of depending lugs adapted to be slidably received in the link grooves. The top plates are made of an elastically deformable material so that they can be applied to an otherwise finished chain by merely sliding the lugs into the link grooves, and then fixedly secured therein by deformation to bind against the sides of the links.

The accompanying drawing illustrates one embodiment of my invention. In such drawings.

Figure 1:
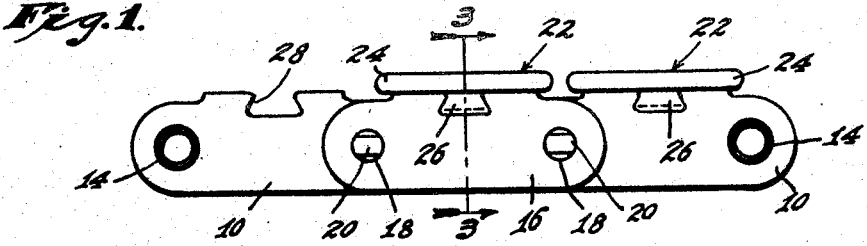
Fig. 1 is a side elevation of a conveyor chain embodying my invention.
Figure 2:
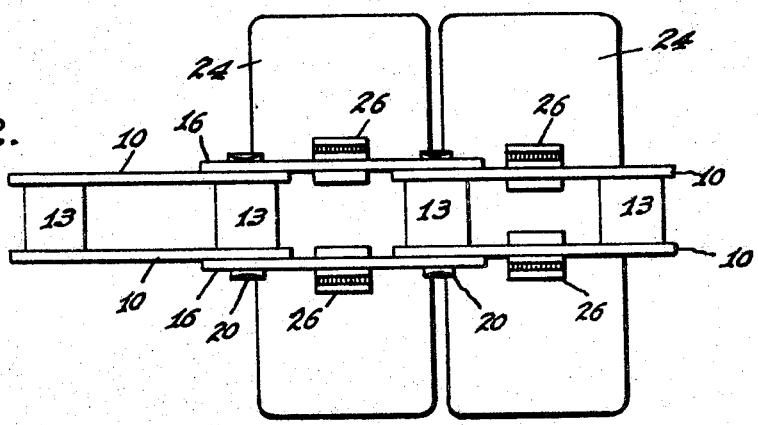
Fig. 2 is a bottom elevation of the chain shown in Fig. 1.

In the conveyor chain shown in Fig. 1, each inner link comprises a pair of inner link plates 10 fixed on the ends of bushings 12 which support rollers 13 adapted to engage the teeth of sprockets with which the chain is used. Said bushings are maintained rigid with the plates 10 by having their ends received with a tight press fit in openings 14 formed at the ends of said links. The inner links, formed as described, are interconnected by outer links each of which comprises a pair of link plates 16, which overlap the ends of adjacent inner links, and are provided with apertures 18. Connection between the overlapping ends of the inner and outer links is provided by pins 20 which are received in the bushings 12 and are tightly press fit in the outer side plates 16.

Figure 3:
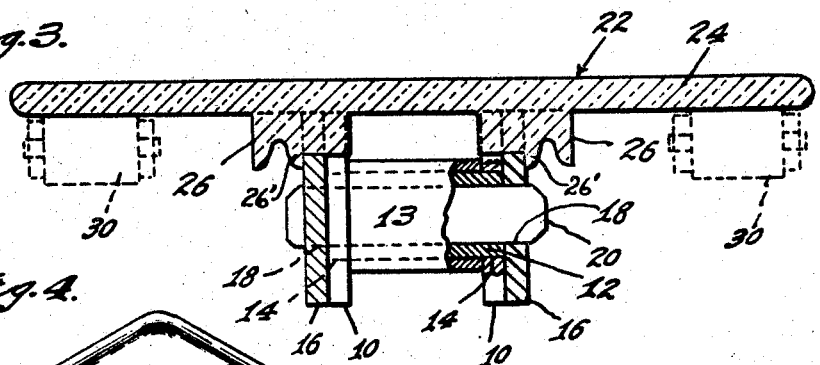
Fig. 3 is an enlarged cross section taken on the line 3—3 of Fig. 1 with parts broken away.
Figure 4:
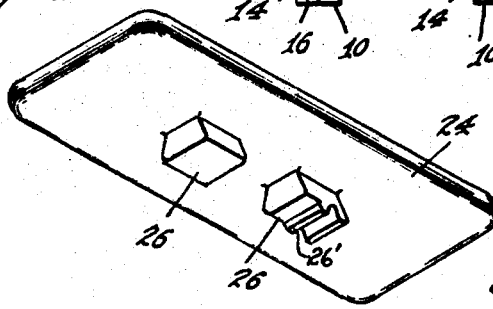
Fig. 4 is an isometric view of a top plate and showing one of the lugs in a deformed link-binding condition.

In embodying my invention in a chain of the type described above, I provide a series of top plates 22 surmounting the chain and forming a surface for supporting articles being transported by said chain. Each of the top plates 22 is provided with an article supporting platform 24 and a pair of dove-tail shaped lugs 26 extending downwardly from the lower face of said platform 24 which are slidably received in correspondingly shaped grooves 28 cut in the upper edge of the link plates 10 and 16. When the lugs are properly received in the grooves 28, they may be distorted so that they overlap and bind against that part of the links adjacent said grooves to fixedly hold the top plates thereon. To permit application of the top plates to the chain they are made of a material capable of such distortion. I prefer to form the top plates of a plastic material, such as nylon, because of its controlled deformability, corrosion resistance, and low coefficient of friction; the latter being of importance since the top plate may be subjected to sliding friction from supporting conveyor tracks 30, as shown in Fig. 3. However, other materials, such as metals, can be employed if desired.

The distortion of the lugs 26 for the purpose of retaining each top plate in fixed position on its associated chain link is conveniently effected by a staking operation in which the material of the lugs is displaced outwardly to form an ear 26' engaging the side of the adjacent link plate. When the top plates are made of nylon or other thermoplastic material, the staking tool may be heated to facilitate the distortion.

In constructing my conveyor chain, the chain proper is assembled in conventional fashion and thereafter the top plates 22 are mounted thereon. To mount said plates, the lugs 26 are slid into the grooves 28 with said plates extending transversely across the links. Each top plate may be held effectively rigid with its associated link by applying a directed force to a point on the lugs 26 laterally beyond the link plates. As shown in Fig. 3, such a force distorts the lugs so that they overlap the link plates adjacent the grooves 28 to produce a bind thereon which rigidly holds said plate in a fixed position on the chain.

I claim as my invention:

1. In a conveyor chain, a series of links, pins pivotally interconnecting adjacent ones of said links, a series of top plates, links and said top plates having interfitting, plate locating provisions engageable by movement of the plates bodily in their own respective planes and transversely of the chain and serving when in interfitting relationship to prevent movement of the plates in a direction perpendicular to the plane of the chain pins, said provisions including lugs on the plates and lug-receiving openings in the links, and ears struck-up from the lugs and engaging the sides of the link to prevent the plate from moving in its own plane to disengage the lugs from the openings.

2. In a conveyor chain, a series of links, pins pivotally interconnecting adjacent ones of said links, at least some of said links comprising spaced link plates provided with dove-tail notches in corresponding side edges, a series of top plates, said top plates having on their lower faces lugs slidably receivable in said notches by movement of the top plates transversely of the chain and parallel to the pins, and means for preventing withdrawal of the lugs from the notches, said means comprising ears struck up from said lugs and engaging the sides of said link plates.

3. A conveyor chain as set forth in claim 1 with the addition that each top plate, including the lugs thereon, is a molding of synthetic plastic.

4. A conveyor chain as set forth in claim 2 with the addition that each top plate, including the lugs thereon, is a molding of synthetic plastic.

(References on following page)

References Cited in the file of this patent

UNITED STATES PATENTS

| | | |
|---|---|---|
| 1,174,965 | Brown | Mar. 14, 1916 |
| 2,143,593 | Bryant | Jan. 10, 1939 |
| 2,267,661 | Meyers | Dec. 23, 1941 |
| 2,466,240 | Joa | Apr. 5, 1949 |
| 2,743,003 | Allen | Apr. 24, 1956 |
| 2,756,868 | Russell | July 31, 1956 |
| 2,792,928 | Holz | May 21, 1957 |
| 2,816,453 | Frank et al. | Dec. 17, 1957 |
| 2,911,091 | Imse | Nov. 3, 1959 |